United States Patent
Londoño et al.

(10) Patent No.: US 6,957,479 B2
(45) Date of Patent: Oct. 25, 2005

(54) METHOD FOR PREPARING A TERMINAL ASSEMBLY FOR BAMBOO

(76) Inventors: Jorge Bernardo Londoño, Carrera 9 No. 73-24 Piso 3, Bogota (CO); Daniel Cheyne, Carrera 9 No. 73-24 Piso 3, Bogota (CO)

( * ) Notice: Subject to any disclaimer, the term of this patent is extended or adjusted under 35 U.S.C. 154(b) by 0 days.

(21) Appl. No.: 10/886,300

(22) Filed: Jul. 7, 2004

(65) Prior Publication Data

US 2004/0238070 A1 Dec. 2, 2004

Related U.S. Application Data

(63) Continuation-in-part of application No. 10/020,661, filed on Oct. 22, 2001, now abandoned.

(30) Foreign Application Priority Data

Oct. 23, 2000 (CO) .............................. 0080257

(51) Int. Cl.⁷ .......................... B23P 19/04; B32B 31/06; B29C 39/02
(52) U.S. Cl. ........................ 29/460; 29/520; 29/525.13; 264/262; 264/268; 264/274; 264/279
(58) Field of Search .......................... 29/423, 458, 460, 29/527.2, 530, 525.01, 525.13, 525.15, 237; 264/261, 262, 263, 268, 271.1, 274, 279; 144/333

(56) References Cited

U.S. PATENT DOCUMENTS

| | | | | | |
|---|---|---|---|---|---|
| 606,623 | A | * | 6/1898 | Durant et al. | 144/333 |
| 3,297,063 | A | * | 1/1967 | McGuire | 144/333 |
| 4,701,065 | A | * | 10/1987 | Orosa | 403/263 |
| 5,433,805 | A | * | 7/1995 | Schmidmeier | 156/84 |
| 5,972,467 | A | * | 10/1999 | Washo | 428/107 |
| 6,551,261 | B1 | * | 4/2003 | Jun | 601/107 |
| 6,576,331 | B1 | * | 6/2003 | Ryan | 428/297.4 |

* cited by examiner

*Primary Examiner*—David P. Bryant
(74) *Attorney, Agent, or Firm*—James B. Conte; Barnes & Thornburg

(57) ABSTRACT

A method to prepare a terminal assembly for different varieties of bamboo, required to form a system of nodes useful in construction, with which points or ends of bamboo such that they can be joined together easily and with great precision; and so that the bamboo can be joined to any other type of material, incorporating it into all kinds of structural system.

7 Claims, 2 Drawing Sheets

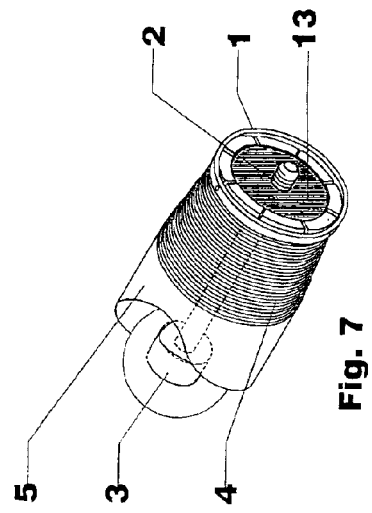
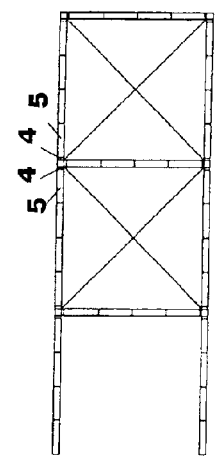
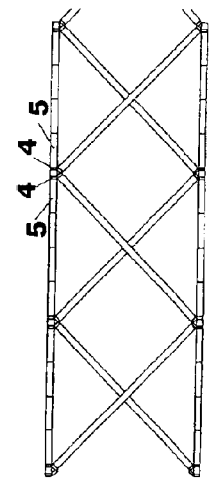
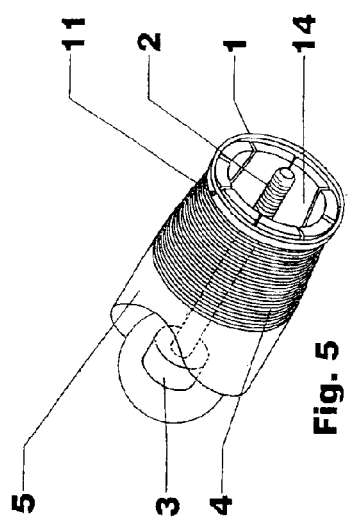
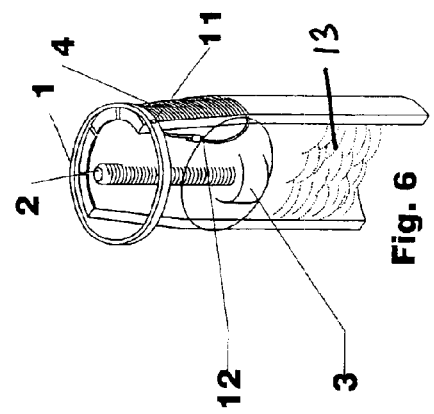

METHOD FOR PREPARING A TERMINAL ASSEMBLY FOR BAMBOO

CLAIM OF PRIORITY

This application is a Continuation in Part of application Ser. No. 10/020,661 filed Oct. 22, 2001 now abandoned. Priority is also claimed based on Colombian patent application 00-80257 filed Oct. 23, 2000, which application is of record in the parent application.

SUMMARY

The process consists of: selecting stems (5) of bamboo, already cured, dried and immunized; the stems (5) are cut to a length required by design specifications; one end of the stem (5) is marked and perforated into eight equal sections (6) prolonging them into the interior of the stem (5) for a length directly related to the diameter of the mouth (8) of the stem (5); some incisions (7) are then made into the end of the stem (5) with each of the sections (6) marked on the base; these incisions (7) are 2.5–3.5 mm wide, and they end with holes made by a wood-drill; then a closing chain (9) is used to close the point which is being worked on so that the mouth (8) of the bamboo is closed 10%; the internal layer of the bamboo is then removed to a depth of 9.5–10.5 cm using a metal scourer or brush (10); once the end of the bamboo stem (5) is closed, the metal ring (1) is inserted the stein has a centrally disposed screw (2) inserted in it after the closing chain (9) is applied, the closing chain (9) then being adjusted to the measurements of the ring (5) to maintain the channels (7) of the bamboo stem (5), the chain is removed; the ring (1) is brought level with the end of the mouth (8) of the stem (5) of bamboo, striking it gently with a hammer; then the end being worked is taken and a orifice (11) is opened in the end of the ring (1) in its lower part, with a diameter equal to that of the steel cable (4); one of the ends of the cable (4) is taken and passed through the orifice (11) leaving a section 7.5–8.5 cm inside the stem (5) of the bamboo; the steel cable (4) is then wound around the stem(5) of bamboo until it reaches the zone where the incisions (7) end, winding the cable (4) some four times more, adjusting it, tensioning it and striking it gently with a hammer in the direction of the steel ring (1) so that there is no space between windings; finally the bamboo stem (5) is perforated to the diameter of the steel cable (4) whose end is then introduced to remain in the stem (5). Once the two ends of the cable are inside, they are tensioned to the maximum and joined by a metal clamp (12), introducing it into the cavity (14); the screw (2) to which a stub (3) has previously been welded is then placed in the cavity (14); then the filling material (13) is poured in the cavity being worked until a first internode of the end of the bamboo stem (5) is full, sporadically vibrating the bamboo stem (5) so that no air bubbles remain inside the cavity (14).

Method for the Preparation of a Terminal Assembly for Bamboo

OBJECT

This application for a Patent of Invention is for a method for preparing a terminal assembly for different varieties of bamboo required to form a system of nodes useful in construction, which obtains points of end of bamboo such that they can be joined together easily and with great precision; and such that they can be joined to any other type of material, incorporating it into any kind of structural system.

BACKGROUND

In the past bamboo has been used in many ways for many different applications. One of the most important has been its use in structural elements and space-dividers, and in the finish of various kinds of building.

A variety of bamboo to be found in several parts of Colombia, Ecuador, and Venezuela, named *guadua angustifolia* has been used in preparing structures. The variety has great physical and mechanical properties and is one of the best for the above described uses.

In Colombia, it has been used in construction since Colonial days, and a regional culture has grown up around construction methods and system which use *guadua*, ranging from very simple and humble constructions to the most grandiose and complex ones.

The *guadua* is part of the collective memory of the inhabitants of these regions, since it has been used to satisfy a wide variety of construction needs, surviving time, earthquakes and other natural disasters. This has been possible since its is highly accessible in terms of cost and reliability.

Throughout history, man has been concerned in developing construction methods and technologies which will solve the problems of high demand for housing and buildings for different uses efficiently and with a low environmental impact. Often, the use of new materials and methods generates complex processes which are highly capital-intensive and have a negative environmental impact since they generate non-biodegradable waste.

It is therefore advantageous to find a practical system for the use of bamboo in construction since it is a totally natural material which does no damage to the ecosystem; indeed, it provides many benefits for the growing zones, and can be exploited in may uses.

Benefits such as the protection of water sources, erosion control, the generation of natural woodland faster than any other forestry resource, and perpetual self-regeneration.

Exploitation has been selective, with only part of the tree being cut down, and this preserves the woodland and maintains the benefits to the ecosystem over time. There is also a high economic impact in the generation of wealth and employment, to the extent that the exploitation of bamboo can become one of the driving forces behind regional development.

The bamboo is a plant which is widely used in other parts of the world, especially the East (China, Japan, India, Indonesia etc.) as well as in Colombia. It has brought development in many fields, especially large-scale construction. Jointing systems, tools and traditional joints have all been tried out.

A search for prior art references was made in the US Patents Bank, and several patents were found to involve bamboo, but all of them were related to the construction of flooring, the manufacture of kiosks and (mostly) in the manufacture of structures for furniture.

German Patent DE 3817236 "Junction Connection for Frameworks consisting of Bamboo", in the name of Brusnowitz Gierg Dipling, published on 23 Nov. 1989, describes a system for the preparation of 3-dimensional structures such as arch-formers using bamboo sticks joined together with metal clamps which tie them together and articulate them.

DISADVANTAGES OF THE PRIOR ART

The disadvantages of the traditional systems of joints, couplings or nodes are:

They require fairly skilled labor, and the use of materials is limited to regions which grow bamboo; where there are no plantations specialized labor has to be brought in from other regions.

The joints and junctions are rudimentary, technically crude and unreliable. This limits their use in constructions requiring refined techniques.

Bamboo structures which have joints and assemblies will fail in an earthquake, or even in the process of preparation itself; the joints do not have a constant patter for tying because stems of different diameters are generally used, a large number of elements are required to manage the joints, and the activity of cutting and adjustment is complex, and all of this leaves a wide margin for imprecision.

The traditional use of bamboo offers more disadvantages at the physical level, since there is the limitation that structural designs which satisfy conventional construction standards and contemporary methods of structural evaluation and design cannot be properly applied: if a building is to be made of bamboo, each variety has its own characteristics and physical properties, and it is impossible to make precise specifications for a structure. This complicates the approval of licenses and acceptance of the material in countries with demanding standards and rules for the clarity and precision of the engineering of materials.

In traditional systems, a joint was formed by using several bamboo stems to support others, and this means that more materials used than should be necessary, since there is no reliable method of making joints which rationally uses bamboo and uses it to its full capacity.

ADVANTAGES OF THE INVENTION

The advantages of the Patent of Invention "method for the preparation of an terminal assembly for bamboo" are the following:

The terminal assembly is practical, efficient, easy to handle, low-cost, and usable with different varieties of bamboo, a natural product which it is difficult to obtain in sizes which coincide precisely; the invention therefore achieves a precise and uniform structural design to match the real function and physical work to be performed by each element in the different parts or zones of the structure.

This invention provides a construction system which allows bamboo stems to be used in mass form, and bamboo structures can be developed which are easily put together and taken apart, with the advantages of using fully replaceable elements.

The points or ends of the bamboo are standardized and can be joined together easily and with great precision or in any kind of material or structure.

The terminals are fully identifiable in terms of resistance and physical properties; they can therefore be dimensioned, calculated, prepared and assembled into any bamboo structure.

With the terminal assembly architectural and structural designs can be produced, saving time in assembly and materials; and skilled labor is not required.

The terminal allows stems to be assembled together in many different ways, transmitting 100% of their physical and mechanical characteristics.

FIGURES ATTACHED

FIG. 5 is a perspective view showing a bamboo stem (5) with steel cable (4) installed.

FIG. 6 is a perspective view showing a transverse section of stem (5) with filling material (13).

FIG. 7 is a perspective view showing a bamboo stem (5) with the completed terminal assembly.

FIG. 8a is an elevational view showing an example of a structure of bamboo stems (5) with the terminal assembly of the invention.

FIG. 8b is an elevational view showing a second example of a structure of bamboo stems (5) with the terminal assembly of the invention.

DESCRIPTION OF THE INVENTION

Figure 1:
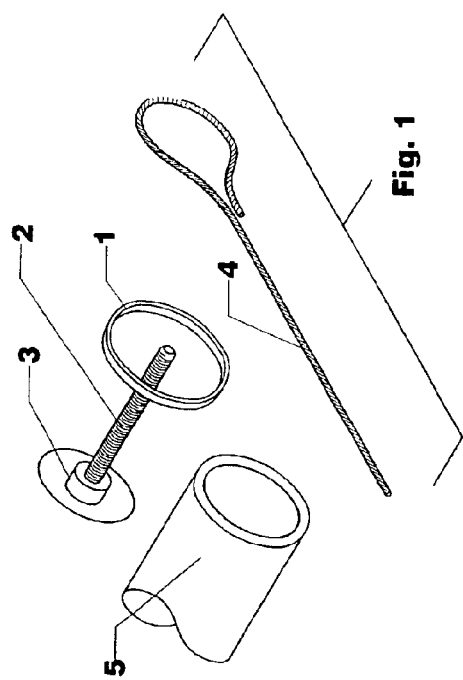
FIG. 1 is an exploded perspective view showing the elements of the terminal assembly in schematic relationship.

The "method for the preparation of an terminal assembly for bamboo" consists of the steps of:

Selection of bamboo stems according to the design of the structure required, and according to diameter, after curing, drying and immunizing;

Cutting of bamboo stems and screws, in accordance with design specifications; The materials, as shown in FIG. 1, required for the preparation of the terminals are:

A metal ring (1) with a diameter of 10% less than the diameter of the bamboo stem to be worked. The caliber of the ring (1) is determined by the structural design and will correspond to the stress to be borne by this element in the specific part of the structure. The height of the ring (1) is directly related to the diameter of the bamboo used, and is equal to 15% of the same.

A 20 cm long steel screw (2) to whose based base a stub (3) is welded or screwed to allow allows for strong anchoring in the filling material. The diameter and resistance of the screw (2) are directly related to the structural design and the stress to be borne in the structure.

A steel cable (4) 5 m×0.32 cm diameter.

A metal clamp (12) to clamp the ends of the steel cable

Filling material (13), which could be a mixture of rock sand, phenol resin and a catalyst, in an amount of 0.5 liters.

At one of the ends of the bamboo stem (5) eight equal sections (6) are marked off prolonged into the interior of the stem (5) for a distance directly related to the diameter of the mouth (8) of the bamboo being worked; the dimension is obtained by dividing the diameter of the stem by two (D=½); then the start of these lines is drilled with a thin wood-drill-bit to avoid scratching the bamboo inside the stem; then some incisions (7) are made from the end of the stem (5) to the point marked where the perforation made with the drill is. This operation is repeated with each of the sections (6) marked on the base. These channels or incisions (7) are between 2.5 mm and 3.5 mm wide and in total there will be eight channels (7) ending at the holes drilled by the drill, as can be seen in FIG. 2.

Figure 2:
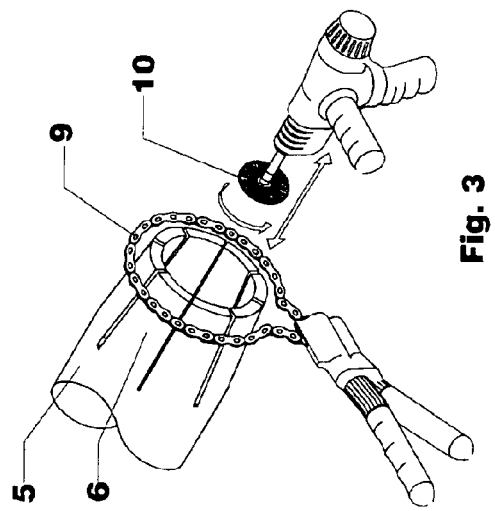
FIG. 2 is a perspective view showing a bamboo stem (5) with sections (6) and closing channels (7) and closing chain (9) operatively positioned.

Then a closing chain (9) is used to close the point worked so that when the end is clamped the mouth (8) of the bamboo is closed by 10%, as shown in FIG. 2

Figure 3:
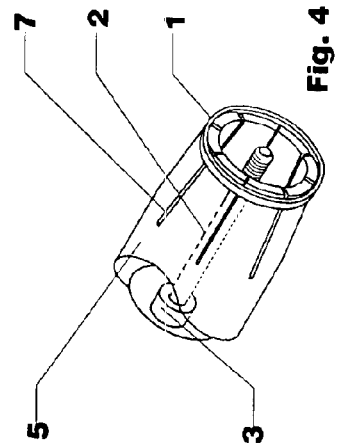
FIG. 3 is a perspective view showing a bamboo stem (5) with metal scourer (10) operatively positioned

The inner layer of the bamboo is then removed to a depth of 9.5–10.5 cm using a metal scourer or brush (10), thus removing the least strong layer of the bamboo and leaving a surface with better adhesion (see FIG. 3)

Once the end of the bamboo stem (5) has been closed, the metal ring (1) is installed. The centrally disposed screw (2)

is inserted in the stem (5) and the closing chain (9) being applied so that the channels (7) in the bamboo to remain closed, adjusting the chain to the measurements of the ring (1) in use. The ring (1) is brought up to the level of the end of the mouth (8) of the bamboo, striking it gently with a hammer (see FIG. 4).

The end being worked is then taken, an orifice (11) is opened at the end of the ring (1) in its lower part, with a diameter equal to that of the steel cable (4). One of the ends of the steel cable (4) is taken and passed through the orifice (11), leaving a section of some 7.5–8.5 cm inside the bamboo stem (5). The steel cable (4) is then wound round the bamboo stem (5) until it passes the zone where the channels (7) end, winding the cable (4) round some four more times. As the cable (4) is being wound, it must be tensioned and struck gently with a hammer towards the steel ring (1) so that there is no space between one wind and the next. Finally, the bamboo stem (5) is drilled to the diameter of the steel cable (4) and the end of the cable is introduced into the hole and left inside the stem. Once the two ends of the cable are inside, they are tensioned to the maximum and joined together by a metal clamp (12) which is introduced into the cavity (14) (see FIG. 5).

The screw (2), to which a stub (3) or a metal support whose function is to keep the screw (2) centered when hardening the filling material (13) has been welded, is taken and the anchor element is left inside. The filling material (13) is then emptied out in the cavity being worked until the first internode at the end of the bamboo stem (5) is full, sporadically vibrating the stem (5) to ensure that no air-bubbles are left inside (see FIG. 6).

The filling material (13) has hardening characteristics which allows it to be manipulated for a few minutes before it reaches the state of formation of gel. Once it has reached this state, the elements remain manageable in order to facilitate storage. After 24 hours the filling material (13) acquires maximum resistance and hardness and can be used for assembly into a structure.

Figure 1A:
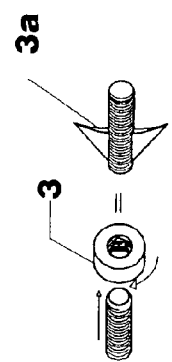
FIG. 1a is a perspective view schematically showing alternative embodiments using welded or screwed stub.

FIG. 1 shows the elements of the terminal assembly schematically: the metal ring (1), the bamboo stem (5), the steel cable (4), the screw (2) and its stub (3). As described above, alternative stubs can be threaded (3) or welded (3a) as illustrated in FIG. 1a.

FIG. 2 shows the bamboo stem (5) with the sections (6), the closing channels (7) and the closing chain (9) formed around the stem (5). A chain wrench such as that shown will be familiar to one of ordinary skill, although other tensioning devices such as strap clamps or rope could be used.

FIG. 3 shows the bamboo stem (5) with the metal scourer/brush (10) in use and the closing channels (7) and the closing chain (9) in place. A power drill will be familiar to one of ordinary skill, although manual scouring could also be used.

Figure 4:
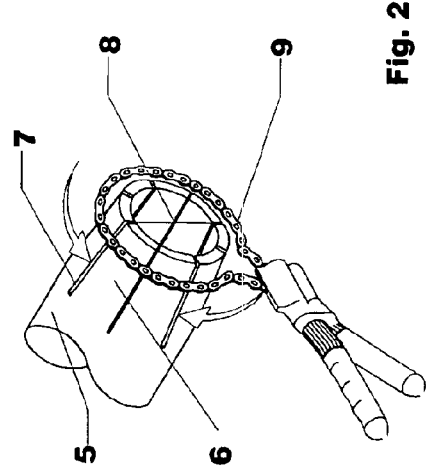
FIG. 4 is a perspective view showing a bamboo stem (5) with metal ring (1) installed.

FIG. 4 shows the bamboo stem (5) with the metal ring (1) installed, the ring surrounding the closed stem (5), which stem (5) has the centrally disposed screw (2). The closing channels (7) having been compressed as shown in preceding figures, are maintained closed by ring (1).

FIG. 5 shows a perspective of the bamboo stem (5) with the steel cable (4) installed in a spiral, the screw (2), and the metal ring (1) with the orifice (11).

FIG. 6 shows a transverse section of the bamboo stem (5) with the metal ring (1) secured to the cable (4) with clamp (12), the screw (2) and its attached stub (3) inserted within cavity (14).

FIG. 7 shows the bamboo stem (5) with the filling material (13) in the cavity (14), forming the finished terminal assembly, with the screw (2) and steel cable (4) installed in spiral.

FIGS. 8a and 8b show examples of a structure with the bamboo stem (5) with the terminal assembly object of the invention. Visible in these views are the bamboo stems (5) and the cable (4) which is spirally wrapped about stems (5) to reinforce the joints.

THE FUNCTIONS OF THE ELEMENTS

The functions of the elements interacting in the method are as follows:

The closing of the end of the bamboo stem (5) forms a cavity in the shape of a cylindrical cone, which tapers at the end, being of a dimension which, when the filling material (13) is hardened in it, forms a wedge perfectly adjusted to the bamboo being worked.

As the screw (2) embedded in the filing material (13) is pulled out, it will try to remove the cone described above, but this will be impossible due to the force generated in the opposite direction by the outer metal ring (1) and the cable (4) which uses its prolongation (both adjusted to the specific measurement of each bamboo, since the stems are not perfectly cylindrical and diameters are not constant even over such a short distance).

These two elements, the ring (1) and the cable (4), generate compression over the entire surface of the bamboo stem (5) which is inside them, transmitting the capacity and the resistance of the bamboo stem (5) to the screw (2). A segment of about 4 cm of the screw (2) remains outside, and can be fixed to joints or anchors of another material, this being incorporated into and forming part of a structural whole.

EXAMPLE OF APPLICATION

In the experiments conducted in the Materials Laboratory of the Engineering Faculty of the Javeriana University, Bogota, the following results were obtained after refining the system:

Four *gaudua angustifolia* bamboo stems (5) were selected after curing and drying, with an outside diameter of approx. 9.5 cm, an internal wall of an average of 1.5 cm and 80 cm long. The terminal assembly was incorporated into two of them and load and tension tests were then performed on them.

Compression. The bamboo element without the terminal assembly collapsed at 11 tons. The bamboo with the terminal assembly withstood slightly over 12 tons, since the terminal reinforces the zone where force is applied and distributed pressure more evenly.

Tension. The bamboo without the terminal assembly is not suited to this experiment since it is not easy to support it or anchor it at the ends. According to calculations made of the resistance indicators for *guadua angustifolia*, a resistance of about 10 tons could be expected. In traditional systems a resistance of about 1.5 tons is achieved before the anchoring system breaks down. The bamboo in this experiment was fitted with a screw easily able to withstand this possible tension. The failure occurred in the middle section of the bamboo, which confirms that the anchor developed is perfectly reliable.

These experiments confirm engineering studies made over the years with bamboo, to the effect that this is an extraordinary materials in terms of its capacity to support and work under tension, definitely better than most other known woods.

They also confirm that the terminal assembly proposed in this invention is not only useful in facilitating construction processes which use bamboo, but also improves physical and mechanical capacity.

The experiments were repeated and the same performance was observed, thus giving full confidence in the process.

It should be noted that the terminal assembly proposed is designed to be used with varieties of bamboo of a certain mechanical and physical capacity, most especially the variety found in Colombia (*Bambusa guadua* or *guadua angustifolia*).

The process of obtaining the terminal assembly in this invention has been developed to be able to be adjusted to any type of bamboo in terms of diameter or length, and is by certain basic parameters described below. As conceived, this assembly offers great flexibility of application, generates efficiency in any structure, and avoids over-dimensioning in the overall structure or any of its component parts.

What is claimed is:

1. A method for the preparation of a terminal assembly for bamboo, comprising the steps of:
   selection of cured, dried and immunized bamboo stems (5) by diameter and according to the design of the structure to be produced;
   cutting of the bamboo stems (5) and a plurality of screws as required by design specifications;
   marking a first end of the bamboo stem (5) in eight equal sections (6), by drawing lines and projecting said lines to points on an inside of the bamboo stem (5) for a distance corresponding to a diameter of a mouth (8) of the bamboo stem (5);
   perforating the beginning of said lines with a thin wood-drill;
   making incisions (7) from the first end of the bamboo stem (5) to each of said points marked at which the perforation already made by the drill is located;
   repeating said preceding steps for each of the sections (6) marked on the base;
   said incisions (7) being about 2.5 mm–3.5 mm wide and when said steps are repeated for each incision, there will result eight channels (7) ending in the holes made by the drill;
   use of a closing chain (9) which allows the point being worked to close such that when the end is clamped the mouth (8) of the bamboo is closed 10%; the inside layer of the bamboo is removed to a depth of 9.5–10.5 cm using a metal scourer or brush (10);
   after the first end of the bamboo stem (5) is closed, installing a metal ring (1) around the stem (5) and a centrally disposed screw (2) within the stem (5), using the closing chain (9) to maintain the channels (7) of the bamboo stem (5) closed, adjusting the chain (9) to the measurement of the ring (1);
   bringing the ring (1) to the level of the end of the mouth (8) of the bamboo stem, striking it gently with a hammer;
   taking the end being worked, opening an orifice through the ring (1), with a diameter equal to that of a steel cable (4).
   taking one of an end of the steel cable (4) and passing it through the orifice (11) leaving a section of 7.5–8.5 cm inside the bamboo stem (5);
   winding the steel cable (4) around the bamboo stem (5) until it passes the zone where the channels (7) end, winding the steel cable (4) round some four times more;
   tensioning the steel cable (4) as it is being wound, and applying gentle blows of a hammer towards the ring (1) in order to ensure that there is no space between one wind and the next;
   drilling the bamboo stem (5) to the diameter of the steel cable (4) and introducing the end to remain inside the bamboo stem (5); once both ends of the cable are inside the bamboo stem (5) they are tensioned to the maximum and joined together by a metal clamp (12), introducing it into a cavity (14);
   centering the screw (2), previously welded to a stub (3) or metal support to steady the screw (2) and inserting a filling material (13) leaving an anchor section inside;
   working the filling material (13) in the cavity (14) until a first internode of the first end of the bamboo stem (5) is filled, sporadically vibrating the bamboo stem (5) in order to ensure that no air-bubbles remain inside.

2. The method of claim 1, further comprising the metal ring (1) has a diameter of 10% less than the diameter of the bamboo stem (5), working to a height of 15% of the diameter of the bamboo stem (5).

3. The method of claim 1 further comprising the screw (2) is 20 cm long and has a stub (3) welded or screwed to its base; with a diameter and strength directly related to the structural design and stresses on it in the structure.

4. The method of claim 1, further comprising the steel cable (4) is 5 m long and has a diameter of 0.32 cm.

5. The method of claim 1, further comprising the filling material (13) is a mixture of sand, phenol resin and a catalyst in a total amount of 0.5 liters.

6. A method for the preparation of a terminal assembly for bamboo, comprising the steps of:
   selection of a bamboo stem (5) having a diameter and a longitudinal axis;
   cutting of the bamboo stem (5) to length, the end defining a mouth;
   selecting a plurality of screws of requisite length;
   marking a first end of the bamboo stem (5) in equal sections (6), said sections projecting a distance corresponding to a diameter of the bamboo stem (5);
   forming incisions corresponding to said marked sections;
   closing said sections by application of compressing;
   treating the inside layer of the bamboo to provide a bonding surface;
   installing a retainer ring (1) to maintain said sections in closed condition;
   inserting a centrally disposed screw (2) in the bamboo stem (5);
   affixing a first end of a tensioning cable (4) to said ring;
   winding said tensioning cable about said stem and securing said cable to said stem (5);
   centering said screw (2) within the end of the bamboo stem;
   introducing a curable filling material (13) in said end;
   curing said material.

7. The method of claim 6, further comprising:
   forming a plurality of bamboo members as described;
   interconnecting said terminals of said bamboo members to form a structural member.

* * * * *